(12) United States Patent
Ishimi

(10) Patent No.: US 7,815,990 B2
(45) Date of Patent: Oct. 19, 2010

(54) OPTICAL RECORDING MEDIUM

(75) Inventor: Tomomi Ishimi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 811 days.

(21) Appl. No.: 10/593,109

(22) PCT Filed: Mar. 14, 2005

(86) PCT No.: PCT/JP2005/004893

§ 371 (c)(1),
(2), (4) Date: May 29, 2007

(87) PCT Pub. No.: WO2005/088627

PCT Pub. Date: Sep. 22, 2005

(65) Prior Publication Data

US 2007/0275206 A1    Nov. 29, 2007

(30) Foreign Application Priority Data

Mar. 16, 2004 (JP) .............................. 2004-073829
Sep. 17, 2004 (JP) .............................. 2004-272411

(51) Int. Cl.
*B32B 3/02* (2006.01)
(52) U.S. Cl. .................... 428/64.1; 428/64.4; 428/64.8; 430/270.14
(58) Field of Classification Search .................. None
See application file for complete search history.

(56) References Cited

U.S. PATENT DOCUMENTS 5,456,815 A    10/1995    Fukuyo et al.

2001/0036526 A1*  11/2001  Fukuzawa ................. 428/64.4
2003/0180473 A1*  9/2003   Nishihara et al. ........... 427/457

FOREIGN PATENT DOCUMENTS

| EP | 1139340 A2 | 10/2001 |
| JP | 7-110964 | 4/1995 |
| JP | 2001-344825 | 12/2001 |
| JP | 3373626 | 11/2002 |
| JP | 2003-288736 | 10/2003 |

OTHER PUBLICATIONS

Dec. 11, 2007 Japanese official action in connection with corresponding Japanese Patent Application No. 2004-272411.
European search report in connection with a counterpart European patent application No. 05 72 1080, Dec. 5, 2008.

* cited by examiner

*Primary Examiner*—Elizabeth Mulvaney
(74) *Attorney, Agent, or Firm*—Cooper & Dunham LLP

(57) ABSTRACT

The optical recording medium according to the present invention comprises a transparent substrate, a recording layer, an optical reflective layer, and a protective layer, wherein the last three layers mentioned are formed on the substrate in this sequence, and enables recoding at a recording linear velocity of 27.9 m/s or more. The optical reflective layer is characterized in that the layer comprises any one of Ag and an alloy mainly made from Ag and a x-ray diffraction spectrum of the optical reflective layer satisfies the relational expression of $0.2 < I(200)/I(111) < 0.4$, in which $I(111)$ is an intensity of the x-ray diffraction peak from (111) plane and $I(200)$ is an intensity of the x-ray diffraction peak from (200) plane determined by x-ray diffraction based on $\theta - 2\theta$ method when the incidence angle relative to the surface of the optically transparent substrate being $\theta$.

7 Claims, No Drawings

OPTICAL RECORDING MEDIUM

TECHNICAL FIELD

The present invention relates to an optical recording medium which has highly reliable storage stability using a reflective layer containing Ag or an Ag alloy therein.

BACKGROUND ART

In recent years, optical discs including CD and DVD (Digital Versatile Disc) as typical examples thereof, and drives for recording and reproducing thereof are widely diffused in the world. Highly reliable storage stability is required for these discs, because they are used for storing data information, images, and the like. Further, with acceleration of price-reduction in discs, manufacturers of optical discs need to lower material costs but need to increase their productivity as well as to ensure the storage reliability of optical discs.

There are two types of optical discs, namely, recordable type and rewritable type. The former, recordable type optical discs generally use organic dyes as recording materials, and the latter, rewritable type optical discs generally use inorganic dyes as recording materials. For these optical discs, reflectance standards are provided so that reproduction of such optical discs is allowable with general-purpose drive players. A recordable type optical disc also is also required to keep a high reflectance, since the compatibility with drive players should be ensured. Materials each having a high reflectance is selected for the reflective layers, because recording layers for recordable type optical discs have properties of absorbing laser beam. As typical materials, there are Au, Ag, and Ag alloy. In this connection, in the case of a ROM disc (Read Only Memory disc), there is no layer for absorbing laser beam therein and a ROM disc offer ample room for the reflectance, and therefore, low-cost Al is used. Au and an Ag alloy respectively have (particularly Au has) a lower reflectance and are more costly than Ag but have excellent durability. An Ag alloy having a less dropped reflectance and good durability has been studied so far. Patent applications using an Ag alloy have been also filed, but such applications may not be employed in practical use because of bottlenecks of the reflectance. On the other hand, film-forming conditions for Ag reflective layers also exert influence upon recording properties. Higher-speed recording and higher-density recording causes increases in the influences.

For example, as described in Japanese Patent (JP-B) No. 3373626, if I (200)/I (111) is changed by changing sputtering conditions to change the film quality of an Ag reflective layer, this will affect recording properties. Then, the patent defines the film quality of the Ag reflective layer to have I (200)/I (111)≦0.2. Further, as described in Japanese Patent Application Laid-Open (JP-A) No. 2001-344825, it is found that changing the quality of Ag film would affect storage reliability of optical recording media. The patent application defines the film quality of the Ag reflective layer to have I (200)/I (111)>0.4.

However, although what is desired for an Ag reflective layer is to have excellent storage properties and is never having negative impacts on recording quality, it is found that Ag reflective layers formed within the ranges of film quality of the above-mentioned patents had negative impacts on either storage properties or recording properties.

In forming recording pits, when introducing laser beam into a disc, the recording layer of the disc absorbs the laser beam to change it to heat, and then recording pits are formed by thermal decomposition, and the way heat diffuses at that time has greatly impacts on recording properties. By changing sputtering conditions for film-forming to form reflective layers, each surface formation of the reflective layers will vary. At the same time, a change in the condition of the reflective layer adjacent to the recording layer will also affect the thermal conductivity. Thus, film-forming conditions of reflective layers have significant impacts on recording properties.

Especially in the case of high-speed recording, the way heat diffuses is very important, because the quick incident beam having a large amount of power is introduced.

BRIEF SUMMARY

In an aspect of this disclosure, there is provided an optical recording medium using a reflective layer comprising Ag or an alloy mainly made from Ag, which has a high reflectance and is more inexpensive than gold reflective layers, by eliminating distortion of the waveform of a reproduced signal in recording properties and degradation of storage stability under conditions of high-temperature and humidity, both of which are disadvantages of a reflective layer comprising Ag or an alloy mainly made from Ag.

In another aspect, there is provided an optical recording medium which comprises a transparent substrate; a recording layer having the main component of organic dyes; an optical reflective layer; and a protective layer, wherein the recording layer, the optical reflective layer, and the protective layer are formed on the substrate in this sequence, recording at a recording linear velocity of 27.9 m/s or more is possible, and the optical reflective layer comprises any one of Ag and an alloy mainly made from Ag The optical reflective layer is characterized in that the layer comprises any one of Ag and an alloy mainly made from Ag and a x-ray diffraction spectrum of the optical reflective layer satisfies the relational expression of $0.2 < I(200)/I(111) < 0.4$, in which $I(111)$ is an intensity of the x-ray diffraction peak from (111) plane and $I(200)$ is an intensity of the x-ray diffraction peak from (200) plane determined by x-ray diffraction based on $\theta-2\theta$ method when the incidence angle relative to the surface of the optically transparent substrate being $\theta$.

DESCRIPTION OF EXEMPLARY EMBODIMENTS

A preferred embodiment of the present invention uses an optical reflective layer satisfying the conditions mentioned above in order to meet both storage properties and recording properties. At a low-recording velocity (within the range of 1x to 4x=3.5 m/s to 14.0 m/s), the present invention does not show remarkable results, but marked differences between the present invention and Related Art is shown in the case where the recording velocity is at 6x, 8x, and 12x (=20.9 m/s, 27.9 m/s, and 42.0 m/s) (to be hereinafter described in examples and comparative examples).

Film-formation of recordable optical discs are usually performed by forming a recording layer comprising organic dyes on a transparent substrate having guide grooves engraved thereon and by further forming a reflective layer and a protective layer on the recording layer. For discs using bonded discs like DVD, another (cover) substrate is further bonded on the protective layer through an adhesive layer.

The transparent substrate is prepared by injection molding through the use of a stamper having guide grooves preliminary engraved thereon, and a polycarbonate is generally used for the material, which is highly transparent and productive.

For the recording layer, a recording material having organic dyes as the main component is used. Here, having the main component means that an amount of dyes enough to assure excellent recording properties is used therein, however, this usually means that a recording layer comprising only dyes is used, except additives such as binders and stabilizers to be added as needed.

To form a recording layer, in ordinary procedures, organic dyes are dissolved in a solvent which dissolve the organic dyes but does not dissolve a substrate, and thereby prepared coating solution is applied to the substrate evenly by spin coating. After applying the coating solution, the recording layer is annealed to remove the solvent residue. The recording layer usually has a thickness ranging from 30 nm to 150 nm.

Next, a reflective layer is formed on the recording layer by sputtering, and then an ultraviolet curable resin is coated thereon by spin coating and cured by ultraviolet to form a protective layer.

Examples of the organic dyes include cyanine dyes, phthalocyanine dyes, naphthalocyanine dyes, anthraquinone dyes, azo dyes, azo dyes containing metal, triphenylmethane dyes, squarylium dyes, chroconium dyes, formazan dyes, azulenium dyes, dithiol metal complex dyes, and indoaniline metal complex dyes. And, for a dye coating solvent, a solvent suitable for the above-mentioned dye is selected among from alcohols, ketones, esters, ethers, aromatic hydrocarbons, alkyl halides, and the like.

For the reflective layer, Ag or an alloy mainly made from Ag is used. It is preferred that the content of Ag in the alloy preferably is 98% by weight or more to ensure the storage stability. Elements to be added to an alloy mainly maid from Ag are gold, copper, palladium, antimony, rhodium, platinum, titanium, molybdenum, zirconium, tantalum, tungsten, vanadium, and the like.

Sputtering is generally used in film-forming for the reflective layer. For gas to be introduced to perform sputtering, inert noble gas is generally used, and argon gas is primarily selected in terms of usability and cost. Concerning sputtering conditions, there are sputtering power, sputtering hour, sputtering gas-pressure or the like. By changing these conditions, the film thickness and the quality can be controlled. In particular, it is known that the quality of the reflective layer can be controlled by changing sputtering gas-pressure.

The sputtering power ranging from 1 kW to 4 kW is suitable in consideration of not having any negative impacts on the recording layer and the film-forming hour.

The quality of the reflective layer can be checked by the numeric value of I (200)/I (111) when I (111) is an intensity of the x-ray diffraction peak from (111) plane and I (200) is an intensity of the x-ray diffraction peak from (200) plane determined by x-ray diffraction based on 0-20 method (one of the methods for evaluating thin films, as disclosed in Japanese Patent Application Laid-Open (JP-A) No. 07-110964) and when the incidence angle relative to the surface of the optically transparent substrate is θ. If the numeric value of I (200)/I (111) is 0.4 or more, the reliability of storage stability will increase but its recording properties will get worse, and if the numeric value of I (200)/I (111) is 0.2 or less, the reliability of storage stability will get worse but there will be no negative impacts on the recording properties. Hence, to satisfy both recording properties and reliability of storage stability, the numeric value of I (200)/I (111) should be 0.2<I (200)/I (111)<0.4, and more preferably 0.21≦I (200)/I (111) ≦0.39. In addition, if sputtering gas-pressure is increased, the numeric value of I (200)/I (111) will increase.

For a reflective layer, particularly when using pure Ag or an Ag alloy containing a small amount of an additive or additives, which are materials capable of realizing a reflective layer having a high reflectance which is required in the case of a high recording linear velocity at 8x or more, defining the x-ray diffraction intensity as I (200)/I (111) enables satisfying both reliability of storage stability and recording properties with a recording linear velocity of 8x or more.

The reflective layer has a thickness from about 70 nm to about 170 nm and preferably is set ranging from 100 nm to 140 nm. If the film thickness is too thin, no satisfactory reflectance can be obtained due to penetrated laser beam, and if too thick, the recording sensitivity and recording properties will get worse, because heat will escape at the time of recording.

As for the protective layer, organic materials such as an ultraviolet curable resin and a thermosetting resin are used. Particularly, an ultraviolet curable resin is preferable, as film-forming is easily performed with the resin.

The protective layer is usually has a thickness from about 3 μm to about 15 μm. Neither a too thin layer nor a too thick layer is preferable. If the thickness of the protective layer is too thin, the durability will lower, and if too thick, this will cause degradation of mechanical properties (bend).

According to the present invention, it is possible to provide an optical recording medium using a reflective layer comprising Ag or an alloy mainly made from Ag, which has a high reflectance and is more inexpensive than gold reflective layers, by eliminating distortion of the waveform of a reproduced signal in recording properties and degradation of storage stability under conditions of high-temperature and humidity, both of which are disadvantages of conventional type of reflective layers comprising Ag or and alloy mainly made from Ag.

EXAMPLES

The present invention will be more specifically described hereinafter referring to examples and comparative examples; however, the present invention is not limited to these disclosed examples.

Examples 1 through 3; Comparative Examples 1 through 3

To check advantageous effects of the present invention, production trials of DVD+R discs were prepared and evaluations thereof were performed.

A squarylium dye expressed by the following Formula 1 and a formazan dye expressed by the following Formula 2 were dissolved in a fluorine alcohol solvent (TFP: 2,2,3,3-tetrafluoropropanol) to prepare a coating solution. The coating solution was applied to a polycarbonate substrate prepared by injection molding having a diameter of 120 mm and a thickness of 0.6 mm, by spin coating, and then the solvent residue was removed in the annealing process at 90° C. for 15 minutes to form a recording layer having a thickness of 50 nm.

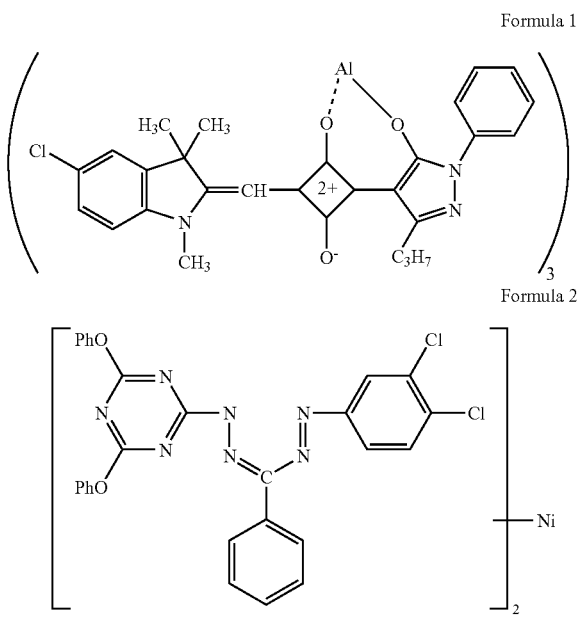

Formula 1

Formula 2

Next, a reflective layer comprising Ag with the purity of 99.99% by weight was formed by sputtering, and an ultraviolet curable resin (SD1700, manufactured by DAINIPPON INK AND CHEMICALS, INC.) was spin-coated thereon and cured by ultraviolet to form a protective layer having a thickness of 4 μm to 8 μm.

Further, a dummy substrate made of the same polycarbonate as the above-mentioned substrate was bonded to the protective layer by using adhesive (DVD003, available from Nippon Kayaku Co., Ltd.) to yield a DVD+R disc. A sputtering apparatus manufactured by Balzers was used for sputtering of an Ag reflective layer, and the sputtering power is fixed at 2 kW. Argon gas is used for sputtering, and the gas pressure was changed within the range of $1.0 \times 10^{-3}$ mbar to $2.0 \times 10^{-2}$ mbar by adjusting the flow rate of argon gas while looking carefully the vacuum gauge equipped in the sputtering apparatus.

The Ag layer was formed by changing sputtering hours so that the film thickness becomes about 125 nm.

Measurement of the film thickness of the reflective layer was performed using a x-ray film-measuring instrument manufactured by CMI, and x-ray diffraction spectrums of the reflective layers formed under various conditions were also measured. The x-ray diffraction spectrums were measured by using an x-ray spectrometer (X'pertPRO; manufactured by Philips Electronics N.V.) under the following conditions:

| X-ray generator | Cu sealed tube |
|---|---|
| X-ray tube voltage | 45 kV |
| X-ray tube current | 40 mA |

Recording properties were evaluated through the use of DDU-1000 manufactured by Pulstec Industrial Co., Ltd. (with a recording and reproducing wavelength of 658 nm) to measure the bottom jitter (the minimum jitter value) and the power margin ΔP/Po at the time of changing the recording power. ΔP represents the width of recording power capable of satisfying jitter standards, and Po represents the recording power at the time of the bottom jitter. Evaluations of recording were performed at 8x (liner velocity: 27.9 m/s), and evaluations of reproducing were done at 1x (linear velocity: 3.5 m/s).

Evaluations on the reliability of storage stability were performed by measuring the PI error (the maximum value) of a disk for which recording was performed at 4x before testing storage stability and then by measuring the PI error (Archive test) after this disc being stored for 300 hours under the conditions of a high-temperature of 80° C. and a high-humidity of 85% RH.

Table 1 shows the results:

TABLE 1

| | x-ray diffraction spectrum | Ar gas | Recording Properties | | Reliability of Storage Stability (PI error max value) | |
|---|---|---|---|---|---|---|
| | I (200)/ I (111) | pressure (mbar) | Bottom Jitter | ΔP/ Po | Before storing | After storing |
| Example 1 | 0.21 | $3.0 \times 10^{-3}$ | 7.3% | 0.16 | 10 | 93 |
| Example 2 | 0.31 | $5.0 \times 10^{-3}$ | 7.4% | 0.16 | 15 | 38 |
| Example 3 | 0.39 | $7.0 \times 10^{-3}$ | 7.5% | 0.15 | 10 | 29 |
| Comparative Example 1 | 0.16 | $1.0 \times 10^{-3}$ | 7.4% | 0.17 | 12 | 588 |
| Comparative Example 2 | 0.44 | $1.0 \times 10^{-3}$ | 7.9% | 0.13 | 16 | 31 |
| Comparative Example 3 | 0.62 | $2.0 \times 10^{-3}$ | 8.5% | 0.10 | 15 | 33 |

As shown Table 1, when increasing the argon gas pressure, the numeric value of I (200)/I (111) increases. When the value of I (200)/I (111) is 0.4 or more, as in Comparative Examples 2 and 3, the recording properties get worse (the bottom jitter increases, and the power margin becomes narrower).

As in Comparative Example 1, when the value of I (200)/I (111) is 0.2 or less, the storage stability gets worse (PI error after the test of storing remarkably increases).

Recording at 1x, 4x, 8x, and 12x were performed on respective discs for Example 2 and Comparative Example 3. Table 2 shows the results of respective bottom jitters evaluated in the same manner as in Example 1.

TABLE 2

| Recording Velocity | Recording Properties (Bottom Jitter) | |
|---|---|---|
| | Example 2 | Comparative Example 3 |
| 1x | 7.2% | 7.2% |
| 4x | 7.3% | 7.4% |
| 8x | 7.8% | 8.5% |
| 12x | 7.9% | 8.9% |

Table 2 shows that the higher the recording velocity increases, the more likely the reflective layer will affect the recording properties. Particularly, the gap in recording properties becomes noticeable when the recording velocity being at 8x or more.

Examples 4 and 5

DVD+R discs were prepared and evaluated in the same manner as in Example 1 except that silver alloy ANC (AgNdCu) was used as the material for the reflective layer. Table 3 shows the results. It should be noted that the contents of NdCu are shown in Table 3. Accurate composition ratios of alloys for Example 4 and Example 5 are respectively $Ag_{98.2}Nd_{0.8}Cu_{1.0}$, and $Ag_{97.7}Nd_{1.0}Cu_{1.3}$.

TABLE 3

| | x-ray diffraction spectrum I(200)/I(111) | NdCu Content (% by weight) | Recording Properties | | Reliability of Storage Stability (PI error max value) | |
|---|---|---|---|---|---|---|
| | | | Bottom Jitter | Reflectance | Before storing | After storing |
| Ex. 1 | 0.21 | 0% | 7.4% | 50.2% | 10 | 93 |
| Ex. 4 | | 1.8% | 7.4% | 49.1% | 11 | 33 |
| Ex. 5 | | 2.3% | 7.4% | 48.4% | 13 | 28 |

As can be seen from Table 3, increasing the amount of NdCu to be added to Ag will increase the reliability of storage stability but will lower the reflectance. Thus, the purity of an Ag alloy is preferably 98% by weight or more.

The invention claimed is:

1. An optical recording medium comprising:
a transparent substrate;
a recording layer having the main component of organic dyes;
an optical reflective layer; and
a protective layer,
wherein the recording layer, the optical reflective layer, and the protective layer are formed on the substrate in this sequence, recording at a recording linear velocity of 27.9 m/s or more is possible,
wherein the optical reflective layer comprises any one of Ag and an alloy mainly made from Ag and a x-ray diffraction spectrum of the optical reflective layer satisfies the following relational expression:

$0.2 < I(200)/I(111) < 0.4$ wherein I (111) is an intensity of the x-ray diffraction peak from (111) plane and I (200) is an intensity of the x-ray diffraction peak from (200) plane determined by x-ray diffraction based on 0-20 method when the incidence angle relative to the surface of the optically transparent substrate being θ.

2. The optical recording medium according to claim 1, wherein the alloy mainly made from Ag contains Ag of 98% by weight or more.

3. The optical recording medium according to claim 1, wherein the optical reflective layer has a thickness of 70 nm to 170 nm.

4. The optical recording medium according to claim 2, wherein the alloy mainly made from Ag further comprises Nd and Cu.

5. The optical recording medium according to claim wherein the alloy mainly made from Ag further comprises Nd and Cu.

6. The optical recording medium according to claim 2, wherein the optical reflective layer has a thickness of 70 nm to 170 nm.

7. The optical recording medium according to claim 6, wherein the alloy mainly made from Ag further comprises Nd and Cu.

* * * * *